United States Patent
Fukui et al.

(10) Patent No.: US 7,027,459 B2
(45) Date of Patent: Apr. 11, 2006

(54) TRANSMISSION LINE TERMINATING APPARATUS THAT PERFORMS PACKET PROCESSING

(75) Inventors: Satoshi Fukui, Yokohama (JP); Tatsuya Oku, Yokohama (JP); Kenji Fukunaga, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 956 days.

(21) Appl. No.: 10/083,997

(22) Filed: Feb. 25, 2002

(65) Prior Publication Data

US 2003/0072308 A1 Apr. 17, 2003

(30) Foreign Application Priority Data

Oct. 17, 2001 (JP) ............................. 2001-319725

(51) Int. Cl.
*H04L 12/56* (2006.01)

(52) U.S. Cl. ........................... 370/425; 370/419; 710/1

(58) Field of Classification Search ................ 370/392, 370/258, 407, 419, 425; 710/260, 1; 714/4
See application file for complete search history.

(56) References Cited

U.S. PATENT DOCUMENTS 5,506,838 A * 4/1996 Flanagan .................... 370/258
6,631,434 B1 * 10/2003 Johnson et al. ............. 710/260

* cited by examiner

Primary Examiner—John Pezzlo
(74) Attorney, Agent, or Firm—Katten Muchin Rosenman LLP

(57) ABSTRACT

Printed circuit boards 11 to 11*n* are connected in a star-like configuration with a single packet processing IC 42, connected to a CPU 41, at its center, each printed circuit board being connected to the packet processing IC by a high-speed supervisory control line 21 having a sufficient transmission capacity to transfer therethrough transparent information and alarm transfer information as well as information from the central processing unit in packet form, and the transparent information and the alarm transfer information are communicated between the printed circuit boards via the high-speed supervisory control line and via the packet processing IC, with provisions made for the packet processing IC to detect a destination from the packet information received from the originating printed circuit board and to transmit the packet information to the terminating printed circuit board. Further, provisions are made to transmit packetized cells to the terminating printed circuit board in accordance with time priority, thereby achieving a transmission line terminating apparatus with a reduced number of wiring lines.

6 Claims, 17 Drawing Sheets

ATM CELL PACKET

FRAME PULSE

DATA

⟵—⟶ TRANSPARENT 1

⟵⟶ TRANSPARENT 2

⟵---- ALARM TRANSFER

TRANSMISSION LINE TERMINATING APPARATUS THAT PERFORMS PACKET PROCESSING

BACKGROUND OF THE INVENTION

1. Field of the Invention

The present invention relates to a transmission line terminating apparatus, that transfers transparent information and alarm transfer information among printed circuit boards connected in a star-like configuration, with a packet processing IC at its center.

2. Description of the Related Art

FIG. 13 is a diagram showing one example of wiring in a prior art transmission line terminating apparatus. In the example of FIG. 13, six units (shelves) 141 to 146 are shown. Each unit contains a plurality of printed circuit boards (PCBs). Among them, a transparent signal 1 is transferred between a printed circuit board (PCB) in the unit 142 and a printed circuit board (PCB) in the unit 143 over a permanently connected line, a transparent signal 2 is transferred between a printed circuit board (PCB) in the unit 141 and a printed circuit board (PCB) in the unit 144 over a permanently connected line, and an alarm transfer signal is transferred between a printed circuit board (PCB) in the unit 145 and a printed circuit board (PCB) in the unit 146 over a permanently connected line. In this way, in this prior art example, each originating printed circuit board (PCB) is connected to its terminating printed circuit board (PCB) via a permanently connected signal line. Many types of signal lines connecting between PCBs can exist other than those shown here.

In the example of FIG. 13, the transparent signal or the alarm transfer signal is transferred only between two designated PCBs. This is not practical because the signal cannot be transferred to and from other PCBs.

FIG. 14 is a diagram showing another example of wiring in a prior art transmission line terminating apparatus. In the example of FIG. 14, units 141 to 146 are wired in a mesh-like configuration forming a matrix switch so that the transparent signals 1 and 2 and the alarm transfer signal can be transmitted from each PCB in each unit to each PCB in every other unit and vice versa.

FIG. 15 is a diagram for explaining how signal lines are wired in a prior art transmission line terminating apparatus in the case where many PCBs are mounted within one unit. In FIG. 15, interface boards (IF boards), multiplexer boards (MUX boards), and demultiplexer boards (DMUX boards) are mounted as the PCBs. The IF boards a to l are mounted on the upper rack, while the MUX boards and DMUX boards, m to x, are mounted on the lower rack.

In the illustrated example, wiring lines for transmission of the transparent signal 1 are permanently connected from the DMUX board r to the IF boards a to d.

Wiring lines for transmission and reception of the transparent signal 2 are permanently connected between the IF board a and the IF board i, between the IF board b and the IF board j, between the IF board c and the IF board k, and between the IF board d and the IF board l, respectively.

Of the wiring lines for alarm transfer, only the wiring line for transmission from the DMUX board r to the MUX board g and the wiring line for transmission from the DMUX board t to the MUX board x are permanently connected.

These wiring lines are permanently formed on the back board of the unit, and the back board is then referred to as the back wired board (BWB).

FIG. 16 is a diagram showing an example of wiring when transferring the transparent signals and the alarm transfer signal among all the PCBs mounted within the unit shown in FIG. 15. In FIG. 16, wiring lines are provided for transmission and reception of the transparent signals and the alarm transfer signal between the IF a and all other PCBS. Though not shown here, separate wiring lines for the different types of signals are also provided for each of the other PCBs for connection to every other PCB.

In the prior art configuration shown in FIG. 13, as each of the dedicated wiring lines for transmission and reception of the transparent information and the alarm transfer information among the PCBs is permanently connected, the prior art has the problem that it cannot provide a flexible network configuration that meets user customization needs.

In the prior art configuration shown in FIG. 14, since wiring lines for transmission and reception of the transparent information and the alarm transfer information have to be provided between all PCBs in every unit and all PCBs in every other unit, the problem is that the number of wiring lines becomes enormous, increasing the complexity of the entire configuration as well as the cost of the apparatus.

In the prior art shown in FIGS. 15 and 16, as the wiring lines among the PCBs are fixed, meaning that the insertion slot position for each PCB in the unit is permanently determined, any PCB cannot be inserted in any slot position, and this causes inconvenience to the operator. Furthermore, if a PCB is built to meet customer needs, the PCB cannot be inserted in the desired slot since the wiring lines are permanently formed on the BWB as earlier described. The resulting problem is that a flexible unit configuration that meets customer needs cannot be provided. Another problem is that since an enormous number of signal lines are needed, not only does the number of PCB connector pins become enormous but the amount of BWB wiring also increases, increasing the complexity and cost of the apparatus.

SUMMARY OF THE INVENTION

In view of the above-enumerated problems of the prior art, and based on the idea of connecting all PCBs in a star-like configuration with one packet processing IC at its center, an object of the present invention is to provide a transmission line terminating apparatus of flexible configuration that can meet customer needs, by reducing the number of wiring lines, thereby simplifying the entire configuration and reducing the cost of the apparatus, and by making provisions for the packet processing IC to transmit all signals to the designated destinations in accordance with the destination information carried in the packets.

To achieve the above object, according to the present invention, there is provided a transmission line terminating apparatus including a plurality of printed circuit boards connected in a star-like configuration with a packet processing IC at its center. Each of the plurality of printed circuit boards is connected to the packet processing IC by a high-speed supervisory control line having a sufficient transmission capacity to transfer therethrough transparent information and alarm transfer information as well as information from the central processing unit in packet form. The transparent information and the alarm transfer information are communicated between the printed circuit boards via the high-speed supervisory control line and via the packet processing IC, with provisions made for the packet processing IC to detect a destination from packet information received from the originating printed circuit board and transmit the packet information to the terminating printed circuit board corresponding to the detected destination.

BRIEF DESCRIPTION OF THE DRAWINGS

The above object and features of the present invention will be more apparent from the following description of the preferred embodiments when read with reference to the accompanying drawings, wherein.

DESCRIPTION OF THE PREFERRED EMBODIMENTS

Figure 1:
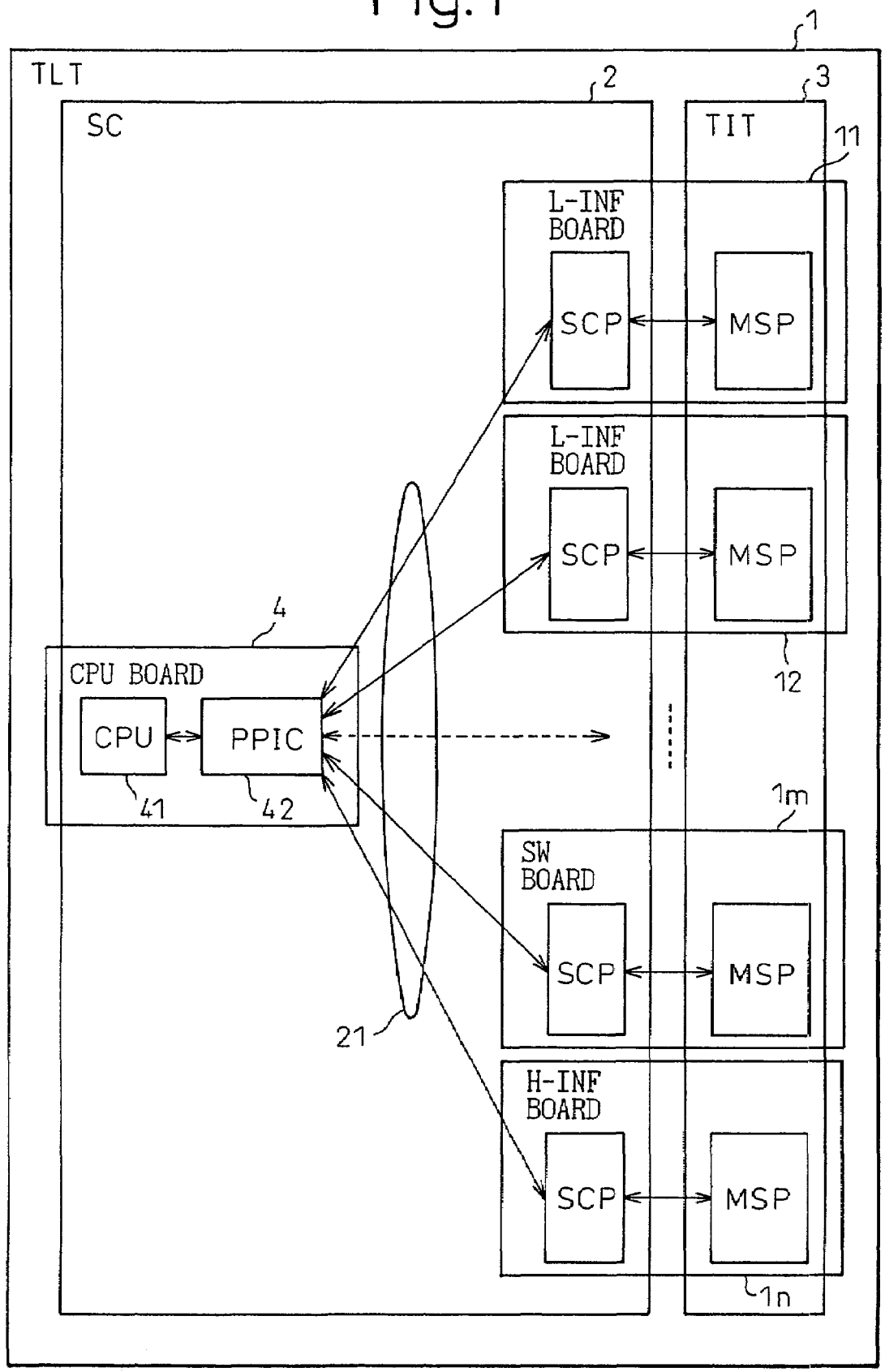
FIG. 1 is a block diagram showing the configuration of a transmission line terminating apparatus according to one embodiment of the present invention.

The preferred embodiments of the present invention will be described below with reference to drawings. Throughout the drawings, the same reference numerals indicate the same elements.

FIG. 1 is a block diagram showing the configuration of a transmission line terminating apparatus according to one embodiment of the present invention. In FIG. 1, the transmission line terminating apparatus (TLT) 1 includes a supervisory control section (SC) 2 and a transmission information terminating section (TIT) 3. A plurality of printed circuit boards (PCBS) 11, 12, . . . , 1m, and 1n are inserted between the supervisory control section (SC) 2 and the transmission information terminating section (TIT) 3. The PCBs 11 and 12 are low-speed interface (L-INF) boards, the PCB 1m is a switch board (SW BOARD), and the PCB in is a high-speed interface (H-INF) board. Each PCB contains a supervisory control processing circuit (SCP) and a main signal processing circuit (MSP).

The supervisory control section (SC) 2 contains a CPU board 4.

The CPU board 4 is mounted with a central processing unit (CPU) 41 responsible for the supervisory control and communication control of the entire apparatus and a single packet processing IC (PPIC) 42 connected to the CPU 41.

All the PCBs 11, 12, . . . , 1m, and 1n are connected to the packet processing IC (PPIC) 42 in a star-like configuration with the packet processing IC (PPIC) 42 at its center. The line connecting between each PCB and the packet processing IC (PPIC) 42 is a high-speed supervisory control line 21 as an interface having a sufficient transmission capacity to transfer therethrough transparent information and alarm transfer information, as well as information from the central processing unit 41, in packet form.

Figure 2:
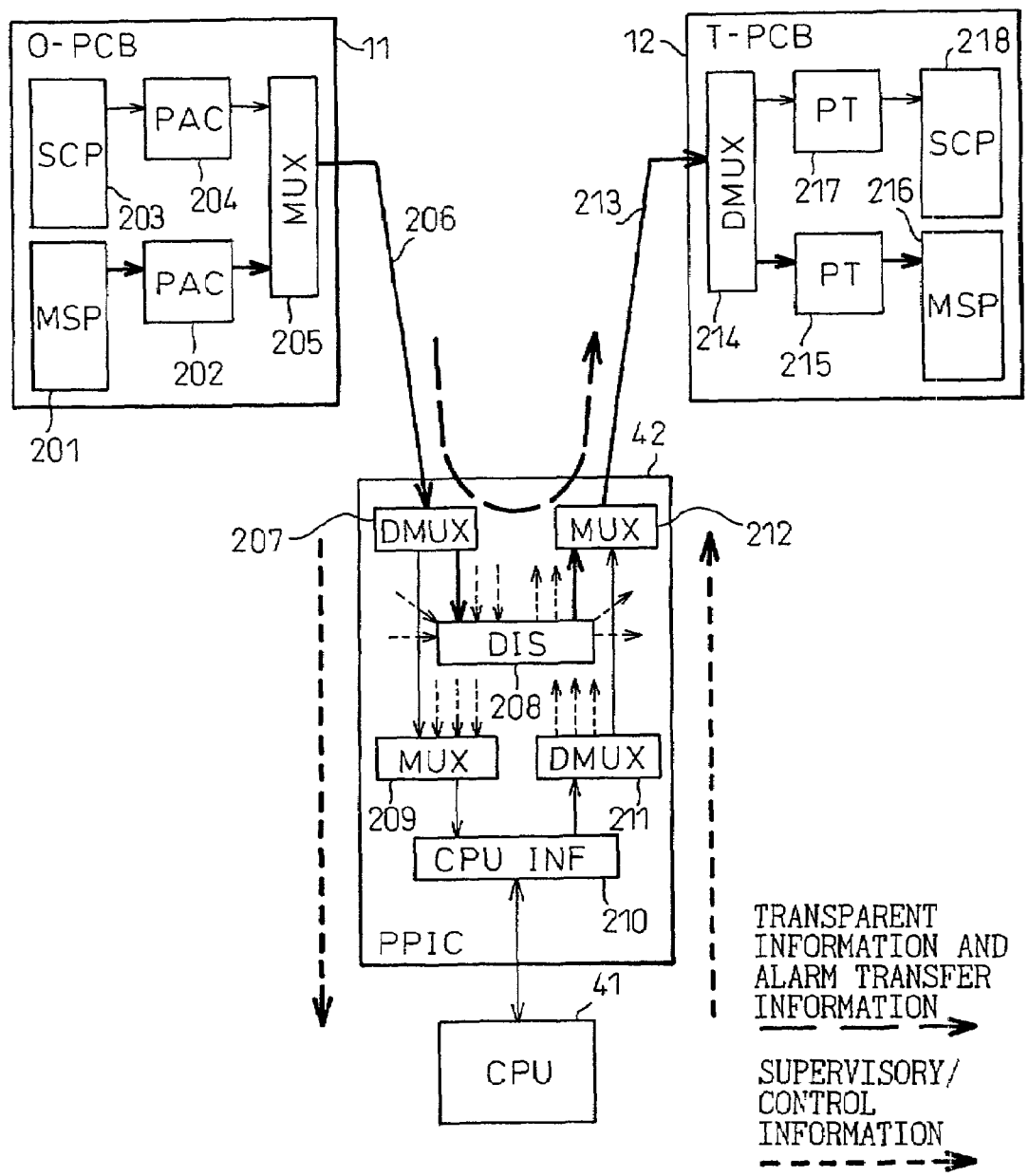
FIG. 2 is a block diagram showing one example of the detailed configuration of two PCBs in FIG. 1 and a packet processing IC 42 interposed between them.

FIG. 2 is a block diagram showing one example of the detailed configuration of two PCBs in FIG. 1 and the packet processing IC (PPIC) 42 interposed between them. In the figure, the PCB 11 is an originating PCB (O-PCB) that sends out packet information, and PCB 12 is a terminating PCB (T-PCB) that receives the packet information.

The originating PCB (O-PCB) 11 includes a main signal processing circuit (MSP) 201, a packetizing circuit (PAC) 202 which packetizes various pieces of transparent information and alarm transfer information output from the main signal processing circuit (MSP) 201, a supervisory control processing circuit (SCP) 203, a packetizing circuit (PAC) 204 which packetizes various pieces of supervisory and control information output from the supervisory control processing circuit (SCP) 203, and a multiplexer (MUX) 205 which multiplexes the outputs of the packetizing circuits 202 and 204.

The originating PCB (O-PCB) 11 is connected to the packet processing IC (PPIC) 42 via a high-speed supervisory control line 206.

The packet processing IC (PPIC) 42 includes a demultiplexer (DMUX) 207 which demultiplexes the packet signal received via the high-speed supervisory control line 206, a distributor (DIS) 208 which determines the destination from the demultiplexed packet signal, a multiplexer (MUX) 209 which multiplexes an output of the DMUX 207 with some outputs of the distributor 208, an interface (CPU INF) 210 which interfaces to the CPU 41, a demultiplexer (DMUX) 211 which demultiplexes the output of the interface 210, and a multiplexer (MUX) 212 which multiplexes an output of the distributor 208 with an output of the DMUX 211. Of the outputs of the DMUX 207, the transparent information and the alarm transfer information are input to the distributor (DIS) 208, while the supervisory/control information is input directly to the multiplexer (MUX) 209 without the intervention of the distributor (DIS) 208. Likewise, of the outputs of the DMUX 211, the transparent information and the alarm transfer information are input to the distributor (DIS) 208, while the supervisory/control information is input directly to the multiplexer (MUX) 212 without the intervention of the distributor (DIS) 208. The distributor (DIS) 208 transfers signals to and from other PCBs. Supervisory/control information from the DMUXs (not shown) corresponding to other PCBs is also input to the MUX 209. The DMUX 211 also outputs information to the MUXs (not shown) corresponding to other PCBs.

The terminating PCB (T-PCB) 12, which is connected to the MUX 212 in the packet processing IC (PPIC) 42 via a high-speed supervisory/control line 213, includes a DMUX 214 which demultiplexes the multiplexed packets into the main signal and the supervisory/control information, a packet terminator (PT) 215 for the main signal packet, a main signal processing circuit (MSP) 216, a packet terminator (PT) 217 for the supervisory/control signal packet, and a supervisory control processing circuit (SCP) 218.

As shown, within the packet processing IC (PPIC) 42, the supervisory/control information is input to the CPU 41 for processing, but the transparent information, such as the main signal and the supervisory/control signal, is delivered to the terminating PCB (T-PCB) which is the destination determined by the distributor (DIS) 208.

Figure 3A:
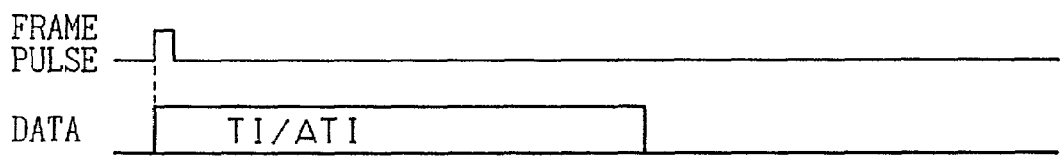
FIGS. 3A to 3E are diagrams showing the flow of information, together with its data format, from time the information is output from a main signal processing circuit 201 in the originating PCB 11 in FIG. 2 to the time it is input to a main signal processing circuit 216 in the terminating PCB 12.
Figure 3B:
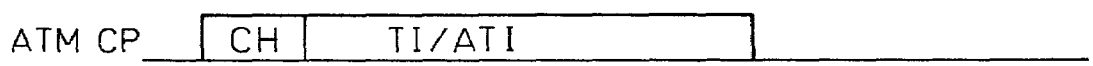

FIGS. 3A–3E show the flow of information, together with its data format, from the time the information is output from the main signal processing circuit 201 in the originating PCB (O-PCB) 11 in FIG. 2 to the time it is input to the main signal processing circuit (MSP) 216 in the terminating PCB 12. As shown in FIG. 3A, the output interface format of the main signal processing circuit (MSP) 201 consists of a frame pulse (FP) and data (D), wherein the data contains the transparent information (TI) and the alarm transfer information. It should be noted here that the alarm transfer information is also transparent information.

The data is packetized by the packetizing circuit (PAC) 202 as shown in FIG. 3A. The present embodiment uses an ATM cell packet as an example of the packet. As shown, the ATM cell consists of a cell header and an information field in which the transparent information (TI) or the alarm transfer information (ATI), etc. are inserted.

Figure 3C:
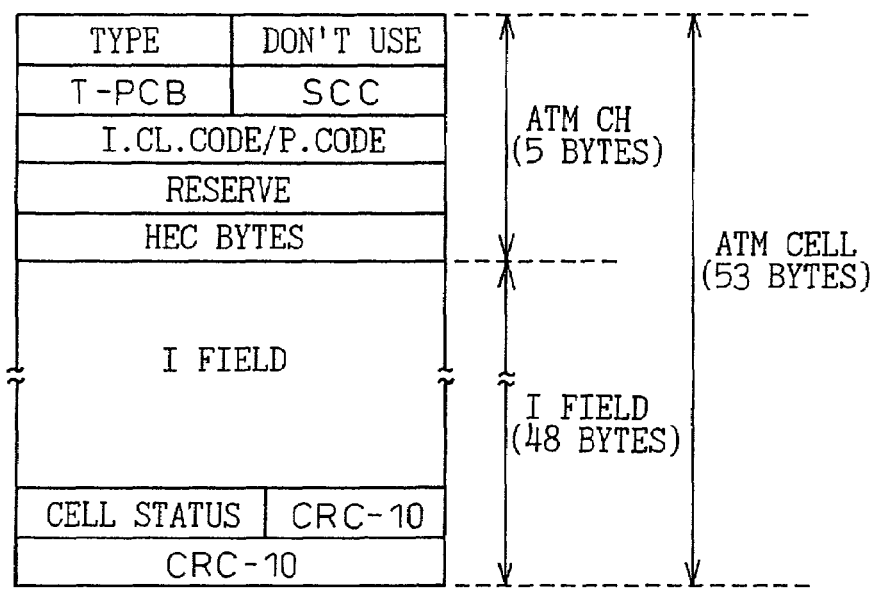

FIG. 3C is a diagram showing an example of the ATM cell format. As is well known, the ATM cell is a 53-byte fixed-length cell consisting of a 5-byte ATM cell header (CH) and a 48-byte information field (I-FIELD).

Since the details of the ATM cell format are defined in ITU-T, only a brief description of it will be given below.

The ATM cell header (CH) contains transparent type (TYPE), don't use, destination (terminating PCB) code (T-PCB), supervisory control code (SCC), information classification code/priority code (I. CL. CODE/P. CODE), Reserve, and (Header Error Control) bytes (HEC BYTES). The transparent type field carries the type of overhead signal (TYPE) to be made transparent, the location of the overhead, the type of protection, etc. The supervisory control code (SCC) carries the type of instruction from the CPU, settings for programming error monitoring, etc. The HEC byte provides information used for CRC calculation. The "don't use" and "Reserve" fields are areas not used. In the present embodiment, the ATM cell is delivered to the terminating PCB by using the destination (terminating PCB code) (T-PCB) and priority code contained in the header.

The information field (I-FIELD) consists of an area for carrying the main part of information, plus areas Cell Status and CRC-10 for monitoring information between the CPU and the PCB.

In the packet processing IC (PPIC) 42, when the ATM cell is received, the distributor 208 detects the destination information contained in the ATM cell and delivers the ATM cell to the terminating PCB (T-PCB).

Figure 3D:
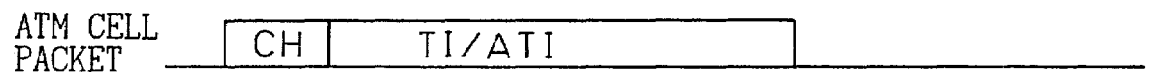

FIG. 3D is a diagram showing the thus delivered ATM cell packet.

In the terminating PCB (T-PCB) 12, the DMUX 214 demultiplexes the received packet into the supervisory/control information packet and the main signal packet, and passes the main signal packet to the packet terminator (PT) 215 where the information proper is extracted from the information field of the ATM cell which is fed to the main signal processing circuit (MSP) 216. The supervisory/control information is extracted from the information field of the ATM cell in the packet terminator (PT) 217, and fed to the supervisory control circuit (SCP) 218.

Figure 3E:
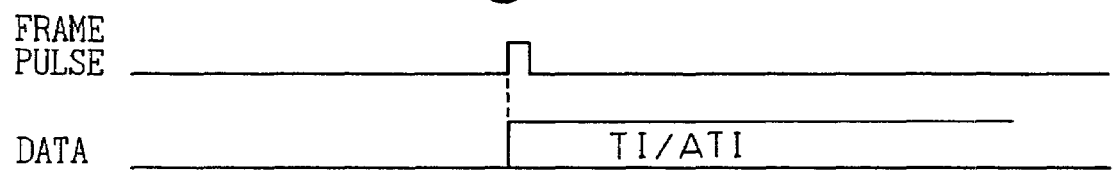

FIG. 3E is a diagram showing the frame pulse and the data, i.e., the main part of information, extracted by the packet terminator (PT) 215. The main part of information is fed to the main signal processing circuit (MSP) 216 for processing.

As described above, since the PCBs are connected in a star-like configuration with the packet processing IC (PPIC) 42 at its center, and the packet processing (PPIC) IC 42 can transfer the packet from the originating PCB (O-PCB) to the terminating PCB (T-PCB) by detecting the destination carried in the packet, any PCB can be inserted in any desired slot in the transmission line terminating apparatus; furthermore, since each PCB is connected to the packet processing IC (PPIC) by a high-speed supervisory control line having a sufficient capacity, there is no need to provide a separate wiring line for each transparent signal type or a separate wiring line for alarm transfer, which has been necessary in the prior art, and since each PCB can be connected to the packet processing IC (PPIC) by a single line, the entire configuration of the apparatus can be simplified and the cost reduced.

Figure 4:
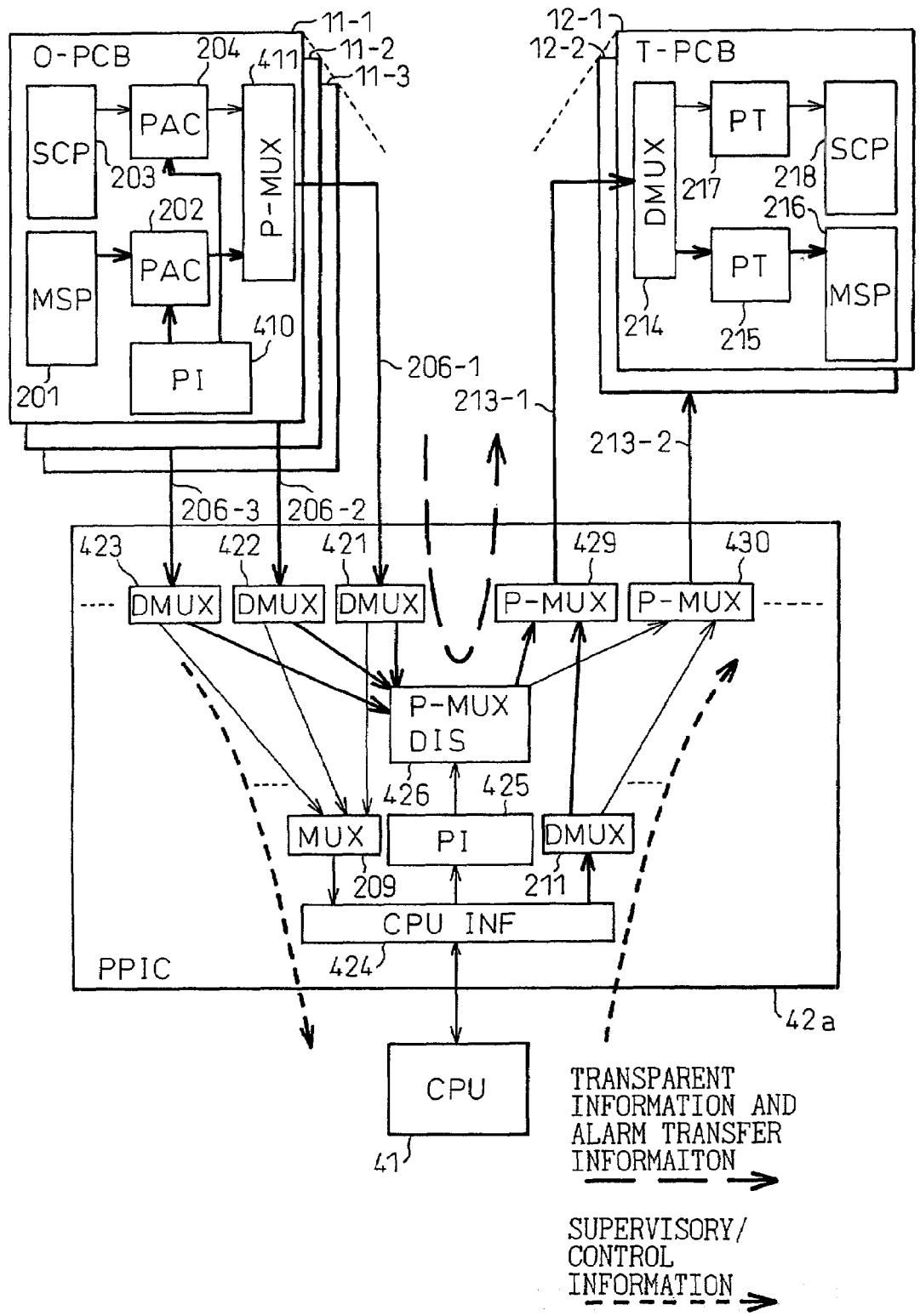
FIG. 4 is a block diagram showing the configuration of a transmission line terminating apparatus according to a second embodiment of the present invention.

FIG. 4 is a block diagram showing the configuration of a transmission line terminating apparatus according to a second embodiment of the present invention. In the figure, packet signals output from a plurality of originating PCBs (O-PCBs) 11-1, 11-2, 11-3, . . . are input into a packet processing IC (PPIC) 42a via high-speed control lines 206-1, 206-2, 206-3, . . . , respectively. The packet signals output from the packet processing IC (PPIC) 42a are delivered to a plurality of terminating PCBs (T-PCBs) 12-1, 12-2, . . . via high-speed control lines 213-1, 213-2, . . . , respectively.

In this embodiment, each originating PCB contains a priority information setting unit (PI) 410 which supplies transmission priority information to the packetizing circuits (PACs) 202 and 204, and a prioritizing multiplexing circuit (P-MUX) 411 which multiplexes the outputs of the packetizing circuits (PACs) 202 and 204 according to the priority information. The packet processing IC (PPIC) 42a includes demultiplexers (DMUXS) 421, 422, 423, . . . which demultiplex the multiplexed packet signals received from the respective originating PCBs 11-1, 11-2, 11-3, . . . into transparent information, alarm transfer information, and supervisory/control information, a priority information setting unit (PI) 425 which sets the priority information received from the CPU 41 via a CPU interface (CPU INF) 424, a prioritizing and multiplexing distributor (P-MUX DIS) 426 which distributes the transparent information and alarm transfer information, demultiplexed by the DMUXS, according to the priority information contained therein or the priority information given from the CPU 41, prioritizing multiplexers (P-MUXS) 429, 430, . . . which multiplex the information received from the prioritizing multiplexing distributor (P-MUX DIS) 426 in time order according to the priority information, and the MUX 209 and DMUX 211 having the same functions as those shown in FIG. 2.

The priority information setting unit (PI) may be provided in both the originating PCB (O-PCB) and the packet processing IC (PPIC), or in either one of them. When it is provided in both, the CPU 41 issues an instruction to determine which priority information is to be used for distribution of the transparent information and alarm transfer information.

The priority information is set in each packet as the priority code which is carried in the ATM header in the ATM cell formation shown in FIG. 3C.

Figure 5:
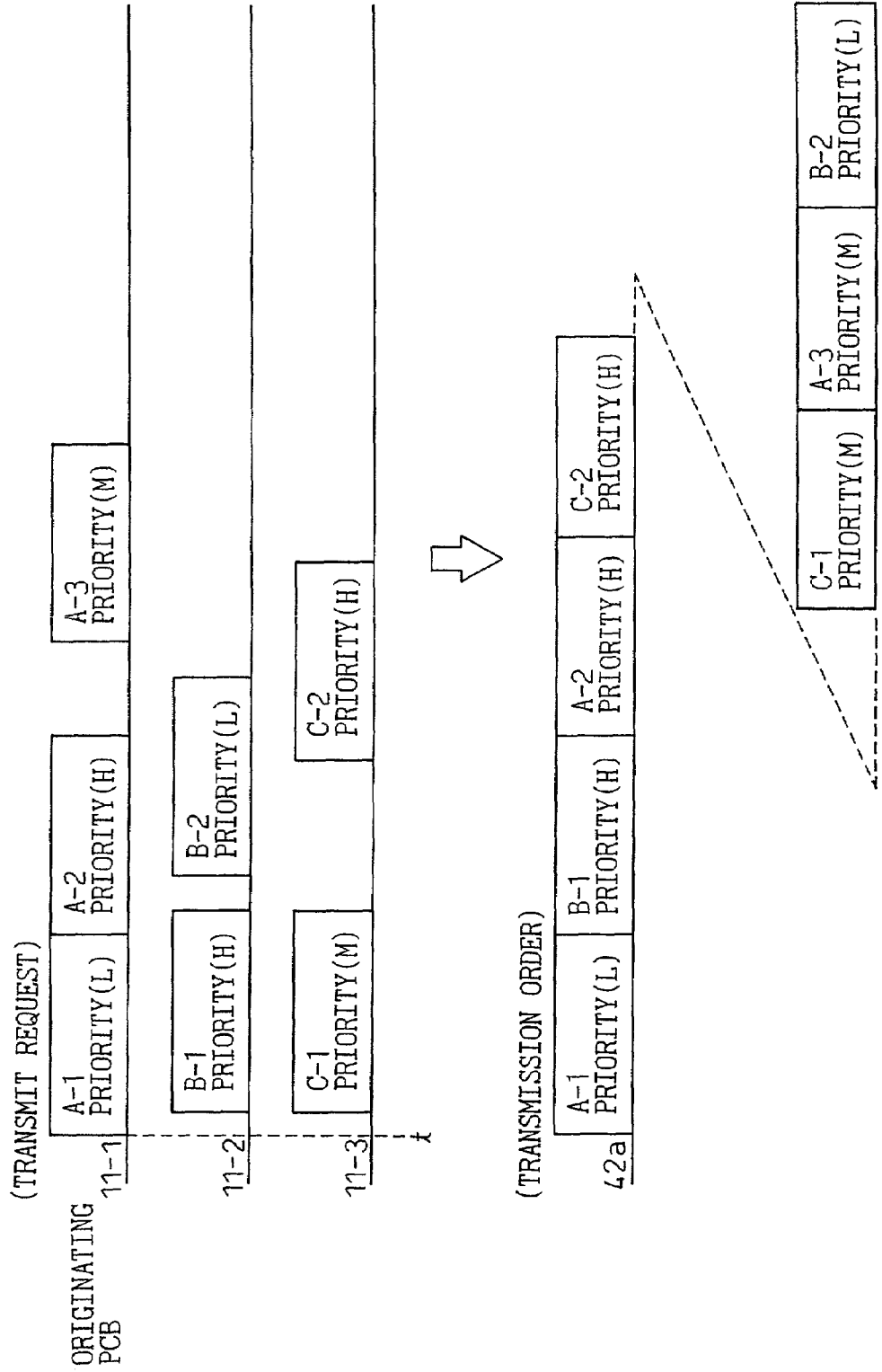
FIG. 5 is a time chart illustrating how cells are distributed according to priority information in the transmission line terminating apparatus shown in FIG. 4.

FIG. 5 is a time chart illustrating how cells are distributed according to the priority information in the transmission line terminating apparatus shown in FIG. 4. In the figure, the time is plotted along the horizontal axis. As shown, it is assumed that no ATM cells are received at the packet processing IC (PPIC) 42a from any PCB before time t, and that an ATM cell A-1 with low-priority L, an ATM cell A-2 with high priority H, and an ATM cell A-3 with middle priority M are output from the originating PCB 11-1 at the respective times shown in the figure, while an ATM cell B-1 with high priority H and an ATM cell B-2 with low priority L are output from the originating PCB 11-2, and an ATM cell C-1 with middle priority M and an ATM cell C-2 with high priority H from the originating PCB 11-3, at the respective times shown in the figure.

Then, considering the received times of the received ATM cells and the priorities assigned to them, the packet processing IC (PPIC) 42a first transmits the first received ATM cell A-1 to the terminating PCB (T-PCB). The next received ATM cells are B-1 and C-1 in the illustrated example, but since B-1 has a higher priority, the ATM cell B-1 is transmitted out. At the time that the transmission of the ATM cell B-1 is completed, the received ATM cells waiting to be transmitted from the packet processing IC (PPIC) 42a are the ATM cell C-1 with middle priority M and the ATM cell A-2 with high priority H; here, since the ATM cell A-2 has a higher priority, the ATM cell A-2 is transmitted out. At the time that the transmission of the ATM cell A-2 is completed, the received ATM cells waiting to be transmitted from the packet processing IC 42a are the ATM cell C-1 with middle priority M, the ATM cell B-2 with low priority L, and the ATM cell C-2 with high priority H. Therefore, the ATM cell C-2 having the highest priority is transmitted out. Thereafter, the subsequent ATM cells are transmitted out in priority order in a like manner.

In this way, according to the configuration shown in FIG. 4, since information (priority code) specifying the time criticality of each piece of information is inserted in the header of the transmit ATM cell at each originating PCB, the packet processing IC (PPIC) 42a can distribute packets in the order of criticality, that is, in priority order, by analyzing the priority code carried in the header of each ATM cell. This achieves the performance that meets customer needs.

Figure 6:
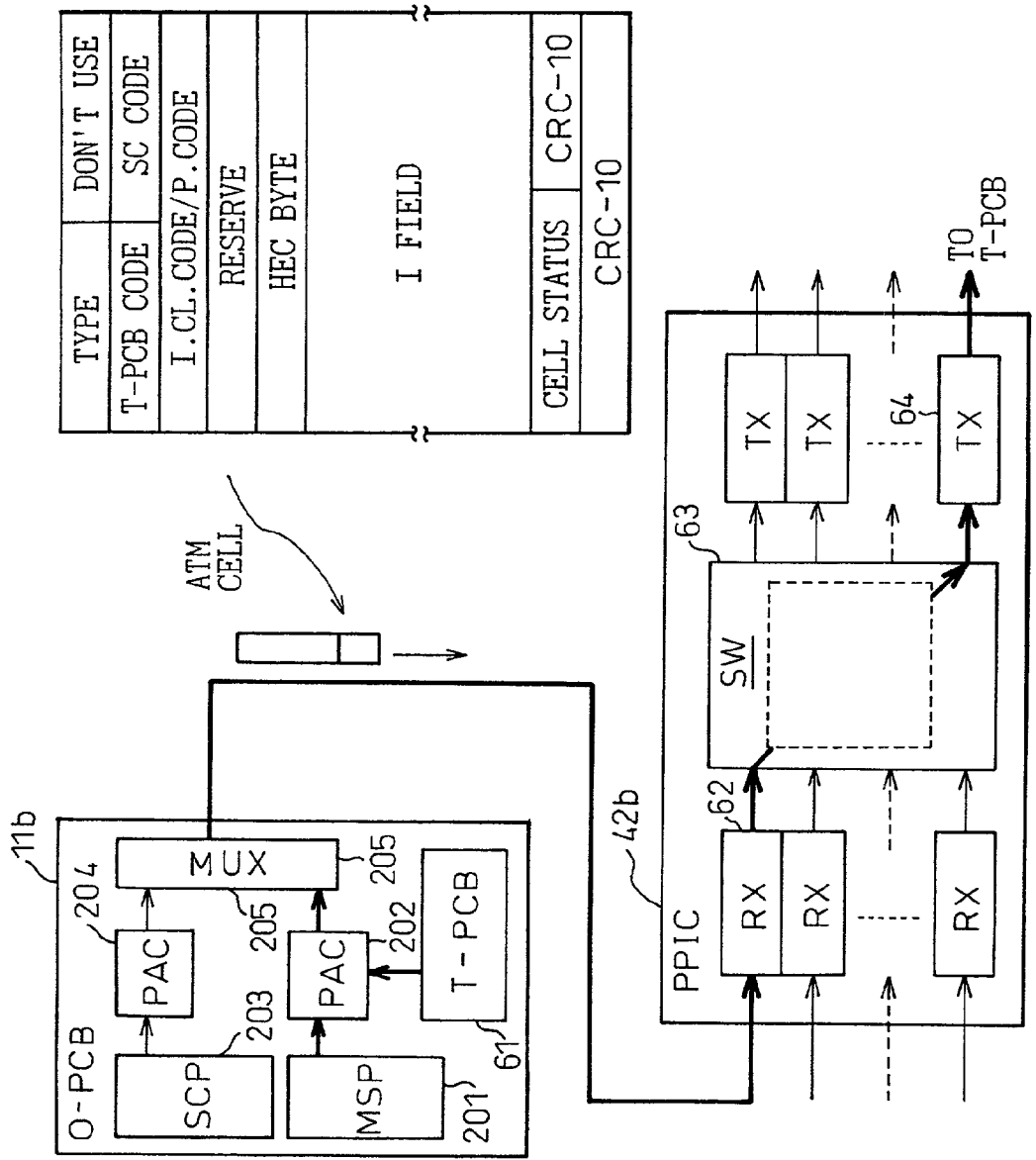
FIG. 6 is a block diagram showing the configuration of a transmission line terminating apparatus according to a third embodiment of the present invention.

FIG. 6 is a block diagram showing the configuration of a transmission line terminating apparatus according to a third embodiment of the present invention. In this embodiment, a terminating PCB information setting unit (T-PCB) 61 for setting terminating PCB information in the packetizing circuit (PAC) 202 is provided within the originating PCB (O-PCB) 11b. The terminating PCB information is inserted in the destination (terminating PCB code) field of the header of the ATM cell to be output from the MUX 205. The packet processing IC (PPIC) 42b includes a plurality of receiving circuits 62, a switch circuit (SW) 63, and a plurality of transmitting circuits (TXs) 64.

The receiving circuit (RX) 62 that received the ATM cell transmitted from the originating PCB (O-PCB) 11b passes the ATM cell to the switch circuit (SW) 63. The switch circuit (SW) 63 identifies the destination carried in the header of the received ATM cell, and passes the ATM cell to the transmitting circuit 64 corresponding to that destination. The transmitting circuit 64 transmits the received ATM cell to the terminating PCB.

Figure 7:
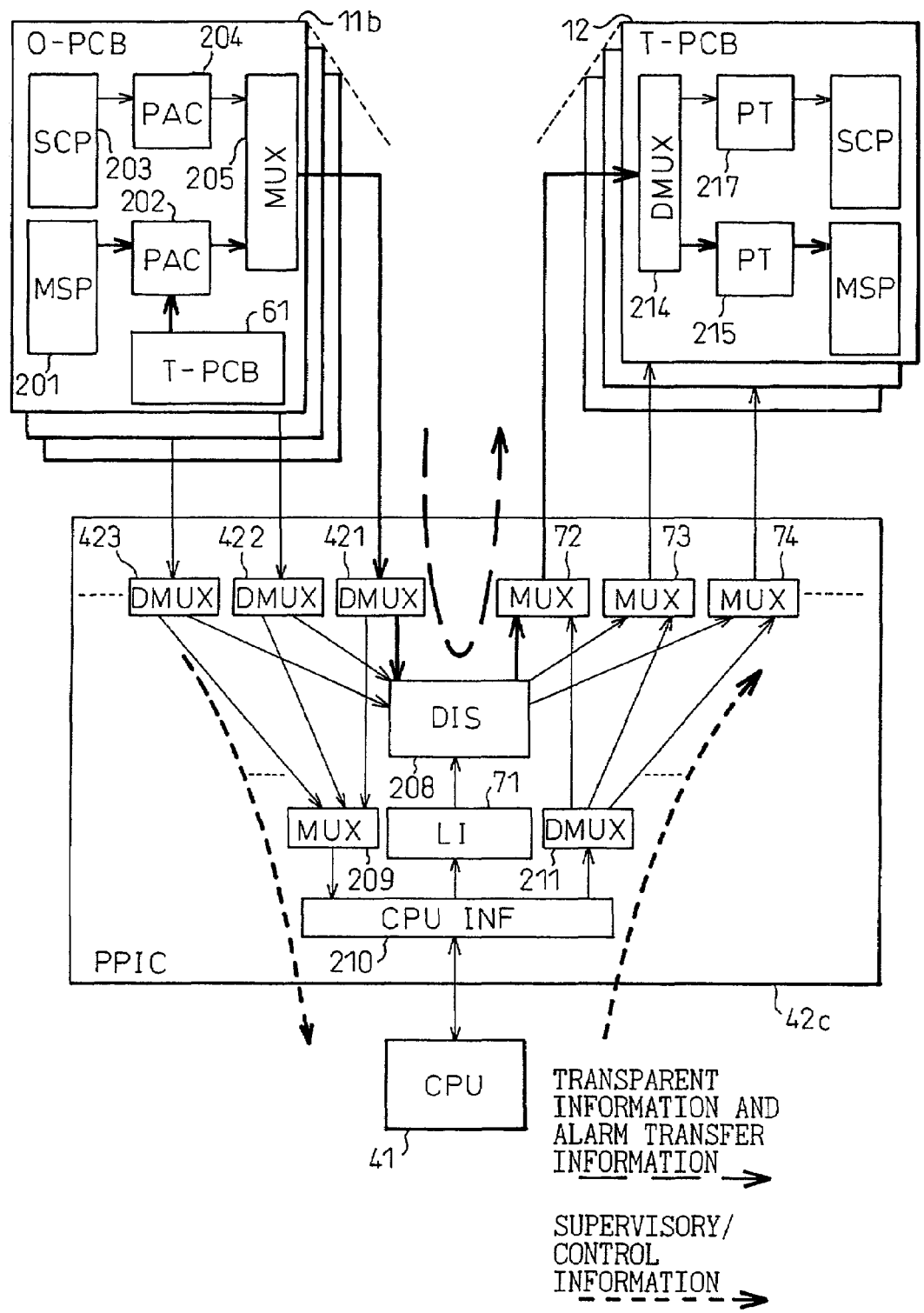
FIG. 7 is a block diagram showing the configuration of a transmission line terminating apparatus according to a fourth embodiment of the present invention.

FIG. 7 is a block diagram showing the configuration of a transmission line terminating apparatus according to a fourth embodiment of the present invention. As shown, in addition to the terminating PCB information setting unit (T-PCB) 61 provided in the originating PCB (O-PCB) 11b as in the embodiment of FIG. 6, a link information setting unit (LI) 71 is provided within the packet processing unit (PPIC) 42c. The link information setting unit (PPIC) 71 supplies the distributor (DIS) 208 with information indicating which originating PCB (O-PCB) is to be connected to which terminating PCB (T-PCB). Based on this link information or on the link information carried in the ATM cell, the distributor (DIS) 208 distributes the ATM cell to the designated terminating PCB.

In the packet processing IC (PPIC) 42c, provisions are made so that which information, the information set by the link information setting unit (LI) 71, the terminating PCB information set within the originating PCB (O-PCB) 11b, or the link information set within the packet processing IC (PPIC) 42c, is to be used preferentially can be determined by an instruction from the CPU 41.

The terminating PCB information setting unit (T-PCB) 61 in the originating PCB (O-PCB) 11b may be omitted, leaving only the link information setting unit (LI) 71 in the packet processing IC (PPIC) 42c.

Figure 8:
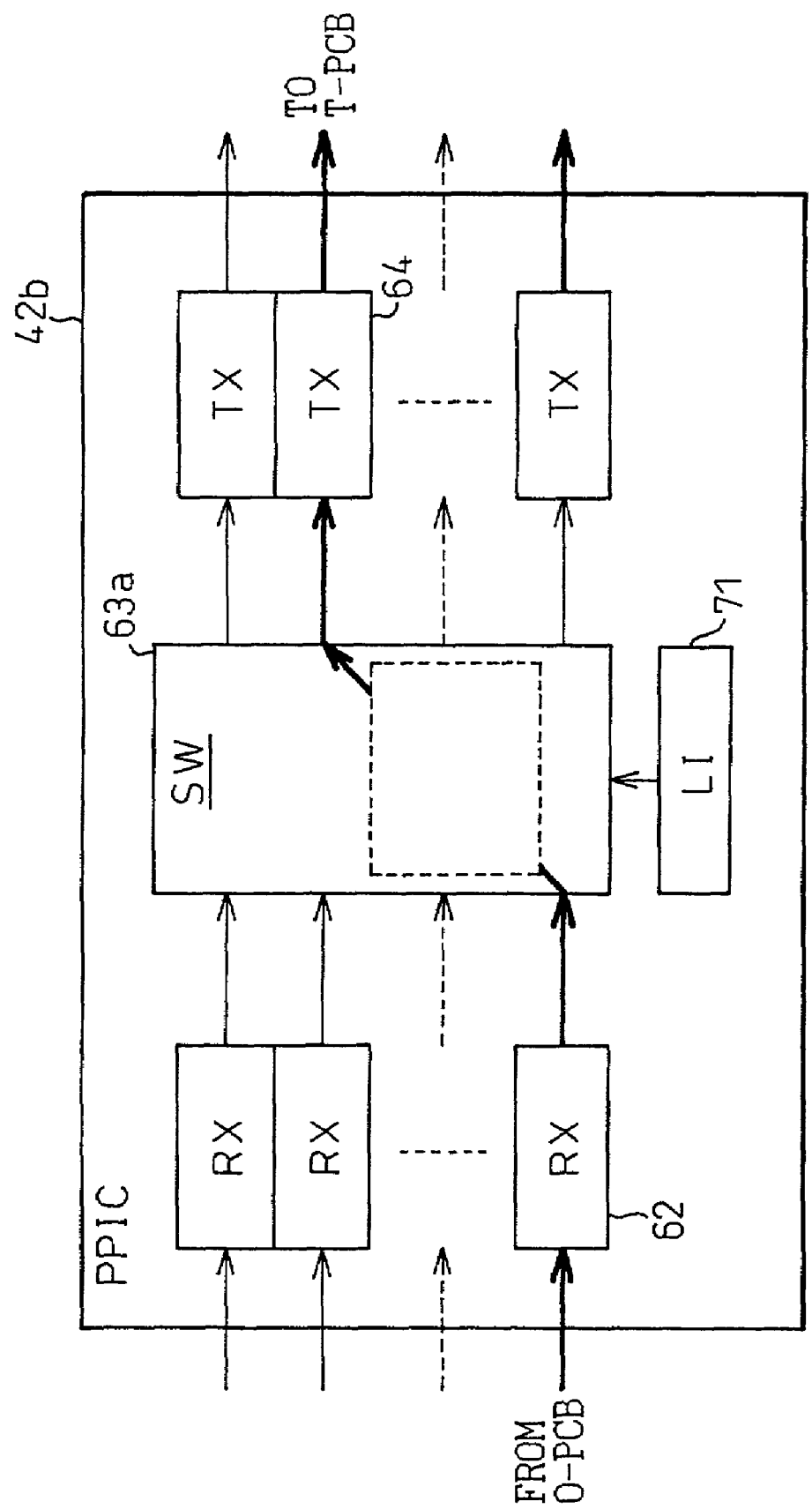
FIG. 8 is a diagram illustrating the case in which link information is set in a switch circuit in the transmission line terminating apparatus show in FIG. 7.

FIG. 8 is a diagram illustrating how, in the transmission line terminating apparatus of FIG. 6, the ATM cell transmitted from the originating PCB and received by the receiving circuit (RX) 62 is switched by the switch circuit 63a to the predesignated transmitting circuit (TX) 64 for transmission to the terminating PCB in accordance with the information supplied from the link information setting unit (LI) 71 provided within the packet processing IC (PPIC) 42b.

According to the third and fourth embodiments, by just setting the terminating PCB information at the originating PCB, the ATM cell can be delivered to the desired terminating PCB without making any changes to the wiring for connection to the PCB. Furthermore, in a transmission line terminating apparatus of the type that accommodates a plurality of PCBs within one unit, any PCB can be inserted in any desired slot because delivery to the desired terminating PCB is possible without changing the BWB wiring.

Figure 9:
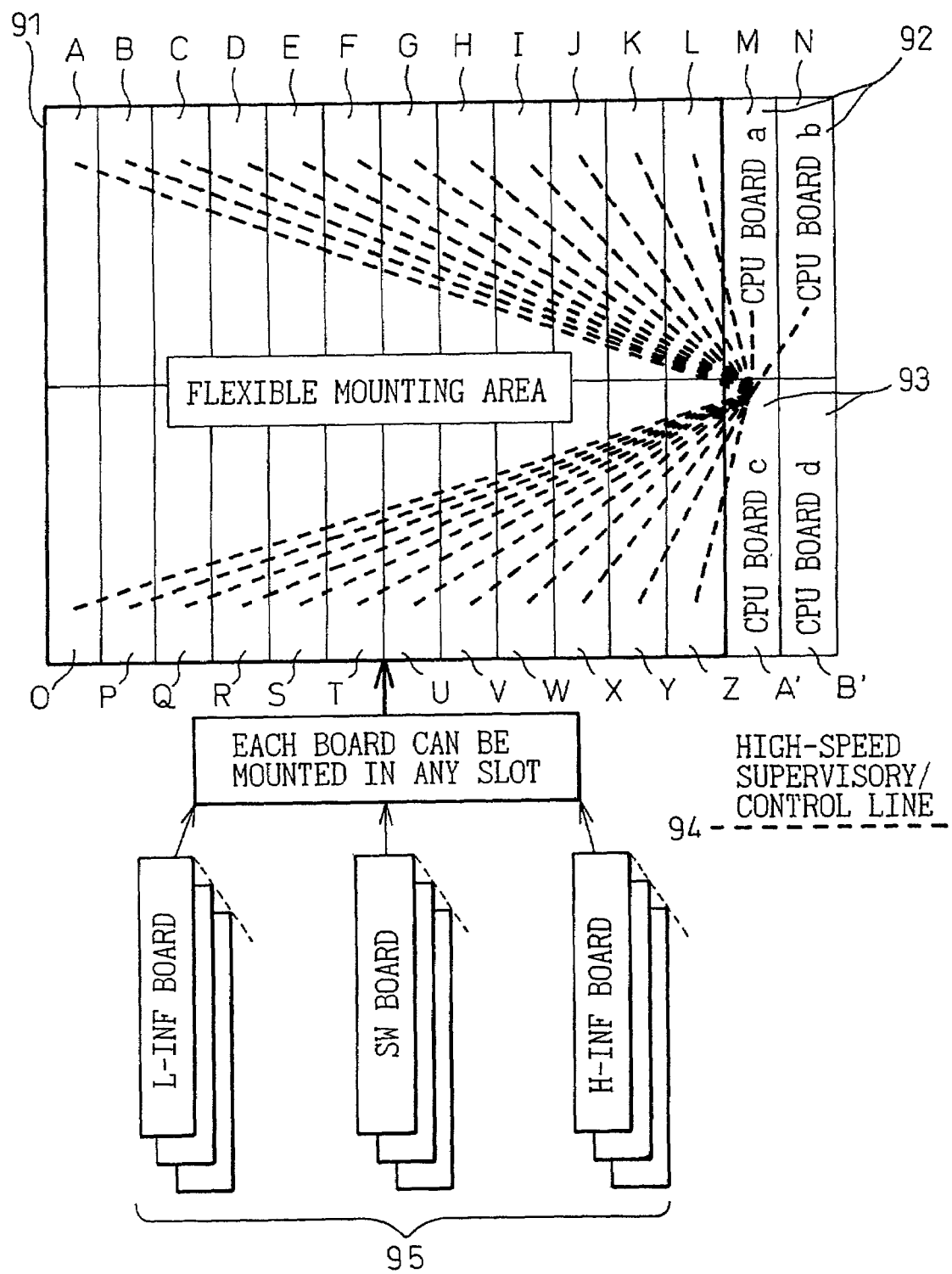
FIG. 9 is a diagram showing an external appearance of a unit when the transmission line terminating apparatus shown in FIG. 7 or 8 is constructed as a single unit.

FIG. 9 is a diagram showing the external appearance of a unit when the transmission line terminating apparatus shown in FIG. 7 or 8 is constructed as a single unit. In the figure, reference numeral 91 indicates the unit which accommodates all the PCBS. A to Z, A', and B' are slots for accommodating the respective PCBS; in this example, a total of 28 PCBs can be accommodated.

Reference numeral 92 indicates a clock board which generates a master clock for the entire unit 91. In this embodiment, the clock board 92 employs a redundant configuration with two PCBs which are mounted in slots M and N, respectively.

Reference numeral 93 designates a CPU board which is equipped with a processor for processing supervisory control information for the entire apparatus and interboard communication information (such as Order Wire, Data Communication Channel, etc. used by maintenance personnel). In this embodiment, the CPU board consists of two PCBs which are mounted in slots A' and B', respectively.

Reference numeral 94 represents a high-speed supervisory/control wiring line, and all the PCBs mounted in the respective slots are connected in a star-like configuration with the packet processing IC 42 (FIGS. 1 and 2), 42a (FIG. 4), 42b (FIG. 6), or 42c (FIG. 7) at its center; here, the packet processing IC is mounted on the CPU board c.

Indicated at 95 are main signal processing PCBs which include low-speed interface (INF) boards, switch boards, and high-speed interface (INF) boards. Each of these main signal processing PCBs can be mounted in any one of the slots A to L and O to Z.

Figure 10:
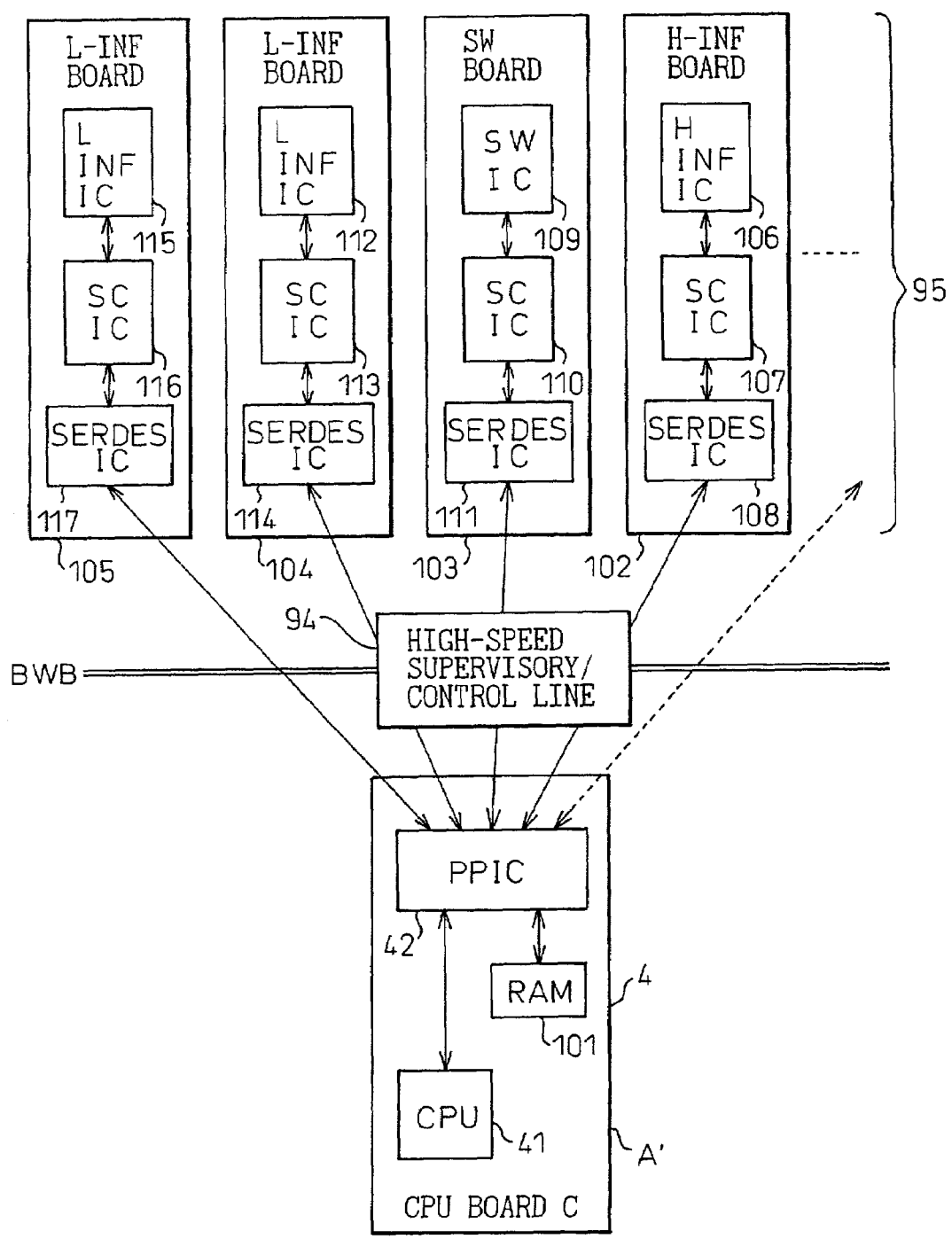
FIG. 10 is a block diagram showing the internal configuration of the unit shown in FIG. 9.

FIG. 10 is a block diagram showing the internal configuration of the unit shown in FIG. 9. As shown, the CPU board c mounted in slot A' includes a CPU 41 and a RAM 101 in addition to the packet processing IC 42. The packet processing IC (PPIC) 42 is connected to the main signal processing PCBs 95 in a star-like configuration via the high-speed supervisory/control lines 94. The main signal processing PCBs include a high-speed interface (H-INF) board 102, a switch (SW) board 103, and low-speed interface (L-INF) boards 104 and 105. The high-speed interface (H-INF) board 102 includes a high-speed interface (H-INF) IC 106, a supervisory control (SC) IC 107, and a serializer/deserializer (SERDES) IC 108. The switch (SW) board 103 includes a switch (SW) IC 109, a supervisory control (SC) IC 110, and a serializer/deserializer (SERDES) 111. The low-speed interface (L-INF) board 104 includes a low-speed interface (L-INF) IC 112, a supervisory control (SC) IC 113, and a serializer/deserializer (SERDES) 114. The other low-speed interface (L-INF) board 105 also includes a low-speed interface (L-INF) IC 115, a supervisory control (SC) IC 116, and a serializer/deserializer (SERDES) 117.

Figure 11:
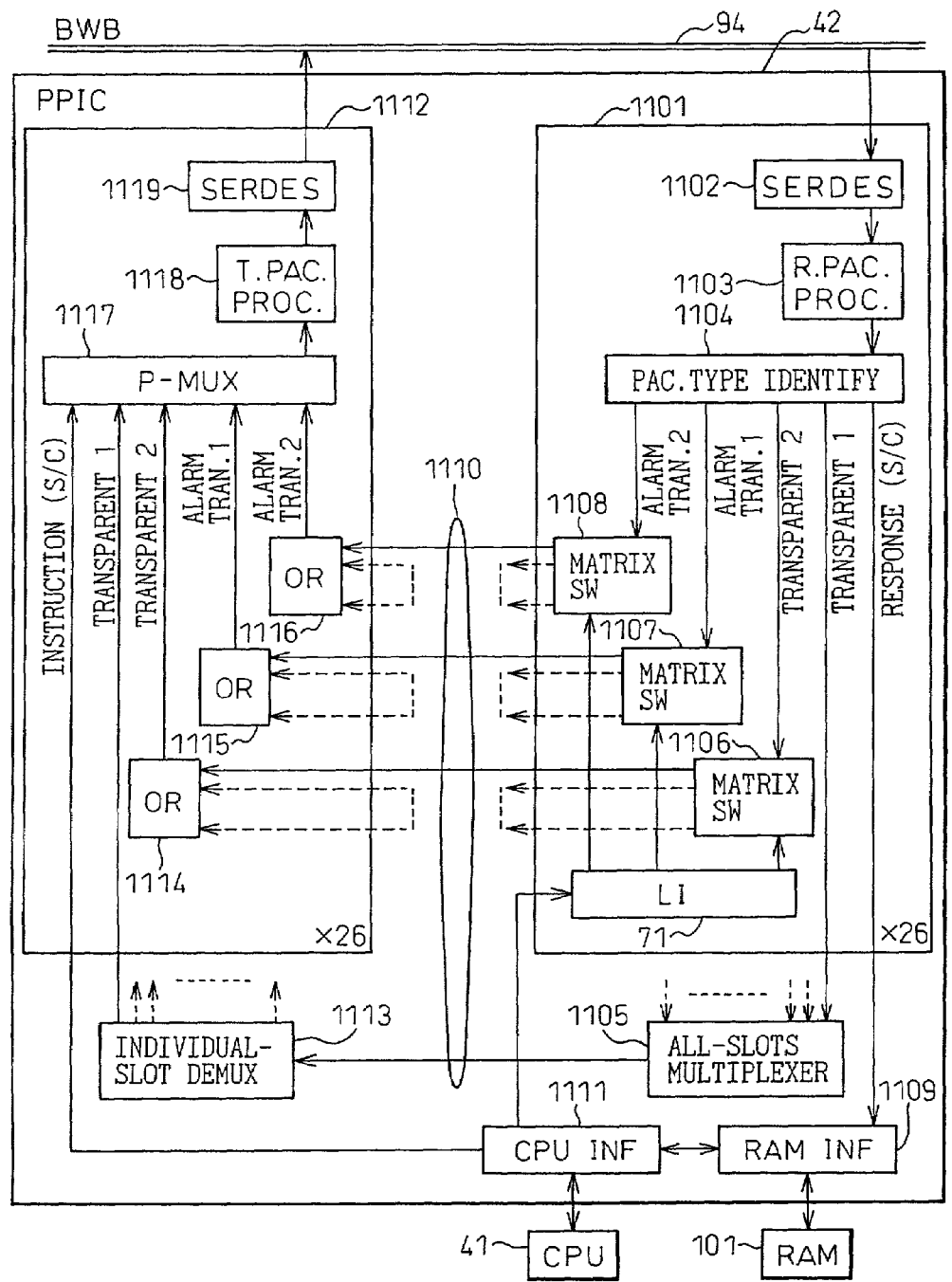
FIG. 11 is a block diagram showing the internal configuration of a packet processing IC 42 mounted on a CPU board e shown in FIG. 10.

FIG. 11 is a block diagram showing the internal configuration of the packet processing IC (PPIC) 42 mounted on the CPU board c shown in FIG. 10. The configuration and operation of the packet processing IC (PPIC) will be described below. The packet processing IC (PPIC) 42 includes receivers 1101 and transmitters 1112. The receivers 1101 and transmitters 1112 are provided, one pair for each of the 26 slots.

Each receiver 1101 includes a serializer/deserializer (SERDES) 1102 which is connected to the high-speed supervisory control line 94 and converts 600-Mbps high-speed ATM cells, received from the main signal processing PCB (FIG. 10), into low-speed ATM cells that can be processed within the packet processing IC (PPIC) 42, a received packet processor (R. PAC. PROC.) 1103 which receives each output cell and performs receive processing such as cell synchronization, cell header error correction and cell discard, descramble, and CRC-10 check and cell discard by calculating the HEC (Header Error Control) in accordance with the ATM protocol, a packet type identifier (PAC. TYPE. IDENTIFY) 1104 which performs sorting by identifying from the header information of the received ATM cell whether the cell packet is a supervisory control response packet, transparent information, or alarm transfer information, a matrix switch (SW) 1106 which distributes the transparent information 2 to the destination, a matrix switch (SW) 1107 which distributes the alarm transfer information 1, a matrix switch (SW) 1108 which distributes the alarm transfer information 2, and a link information setting unit 71 which determines the destination of the output of each of the matrix switches.

The response signal such as the supervisory/control signal is transferred to a prioritizing multiplexer (P-MUX) 1117 in the transmitter 1112 via the RAM interface 1109 connected to the RAM 101 (FIG. 10) and the CPU interface 1111 connected to the CPU 41 (FIG. 1).

The transparent signal 1 from each slot is transferred to the prioritizing multiplexer (P-MUX) 1117 in the transmitter 1112 via an all-slots multiplexer 1105 and an individual-slot demultiplexer 1134.

Each transmitter 1112 includes an OR circuit 1114 which ORs the transparent signal 2 from each receiver 1101 and supplies the result to the prioritizing multiplexer (P-MUX) 1117, an OR circuit 1115 which ORs the alarm transfer signal 1 from each receiver 1101 and supplies the result to the prioritizing multiplexer (P-MUX) 1117, an OR circuit 1116 which ORs the alarm transfer signal 2 from each receiver 1101 and supplies the result to the prioritizing multiplexer (P-MUX) 1117, the prioritizing multiplexer 1117 which multiplexes the ATM cells for distribution by rearranging them in order of priority according to the preset priority explained with reference to FIG. 5, a transmit packet processor (T.PAC.PROC.) 1118 which performs transmit processing such as HEC insertion, CRC-10 insertion, scramble, etc. on each ATM cell output from the prioritizing multiplexer 1117, and a serializer/deserializer (SERDES) 1119 which performs conversion to a high-speed signal for transmission on the BWB wiring line 94.

Figure 12:
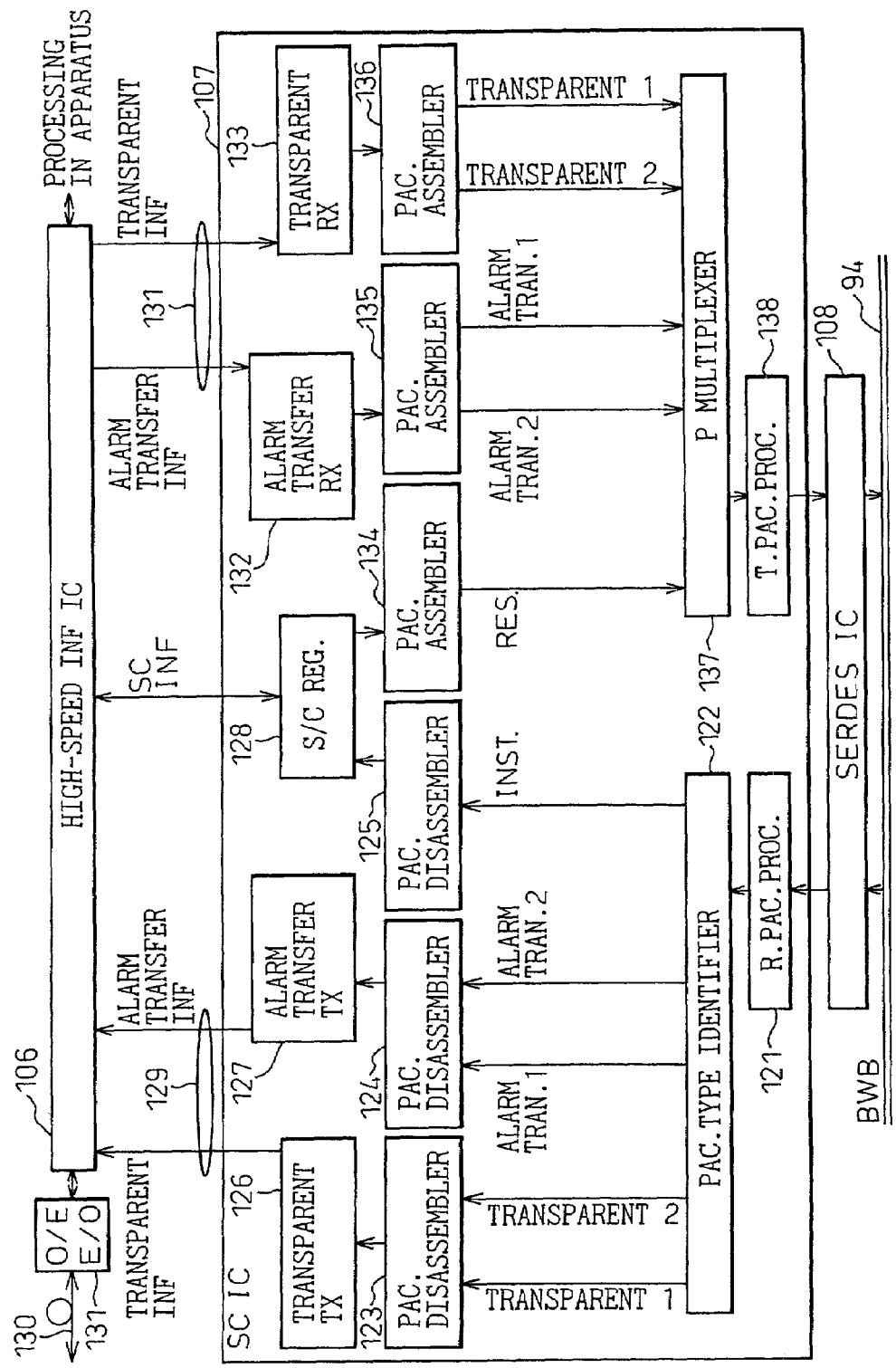
FIG. 12 is a block diagram showing the internal configuration of a supervisory control IC mounted on each of the main signal processing PCBs 95 (low-speed interface boards, switch boards, high-speed interface boards, etc.) shown in FIG. 10.
Figure 13:
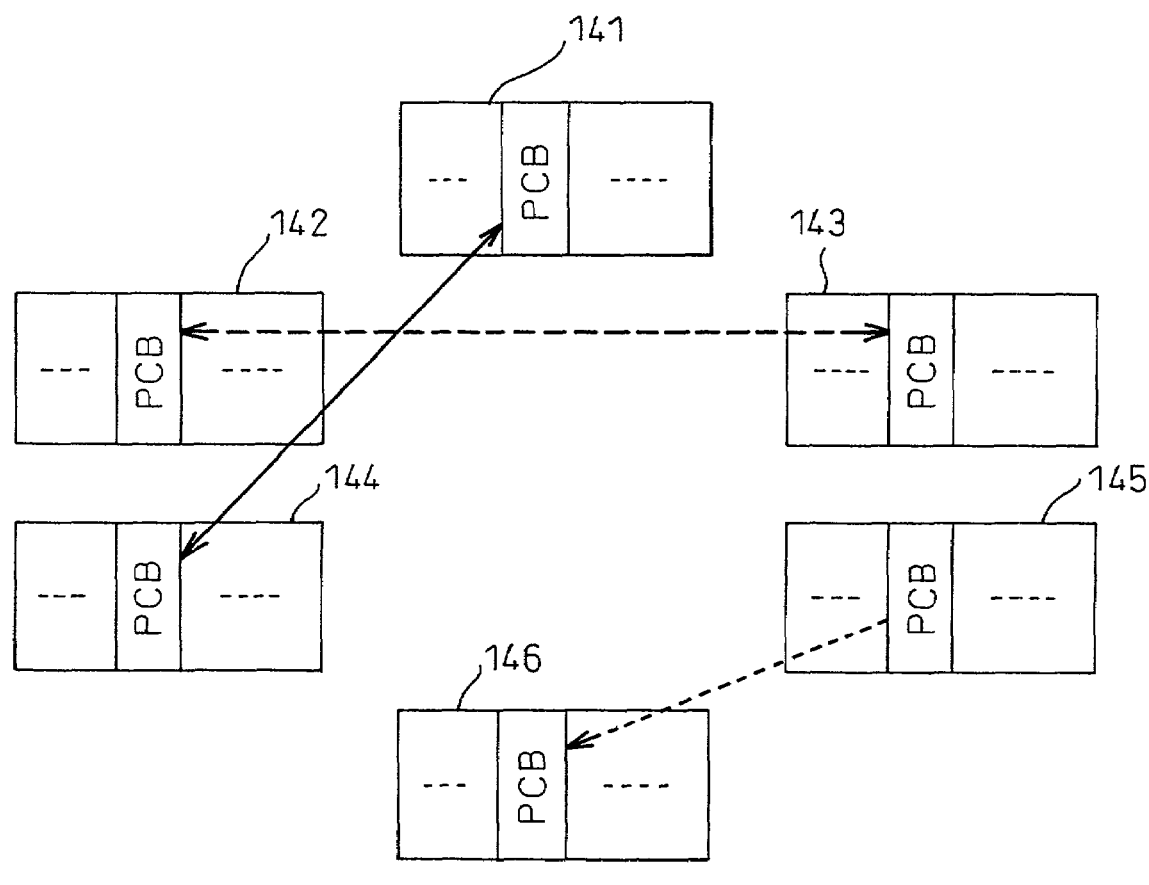
FIG. 13 is a diagram showing one example of wiring in a prior art transmission line terminating apparatus.
Figure 14:
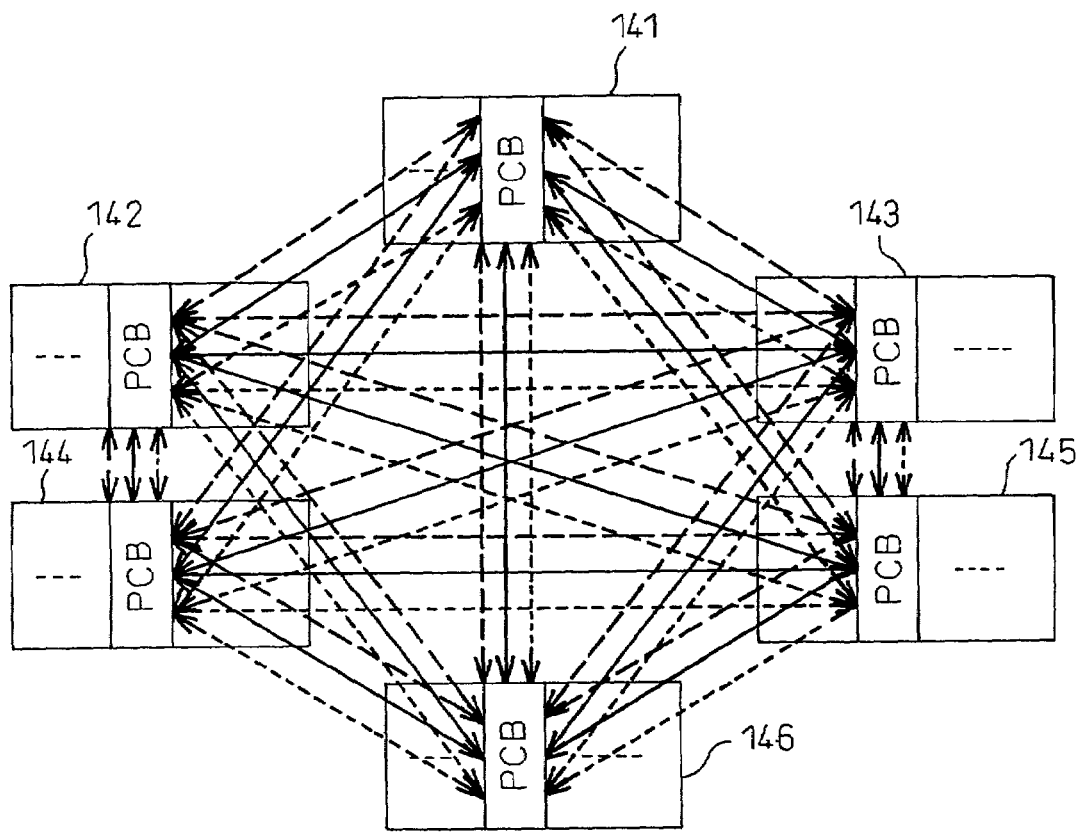
FIG. 14 is a diagram showing another example of wiring in a prior art transmission line terminating apparatus.
Figure 15:
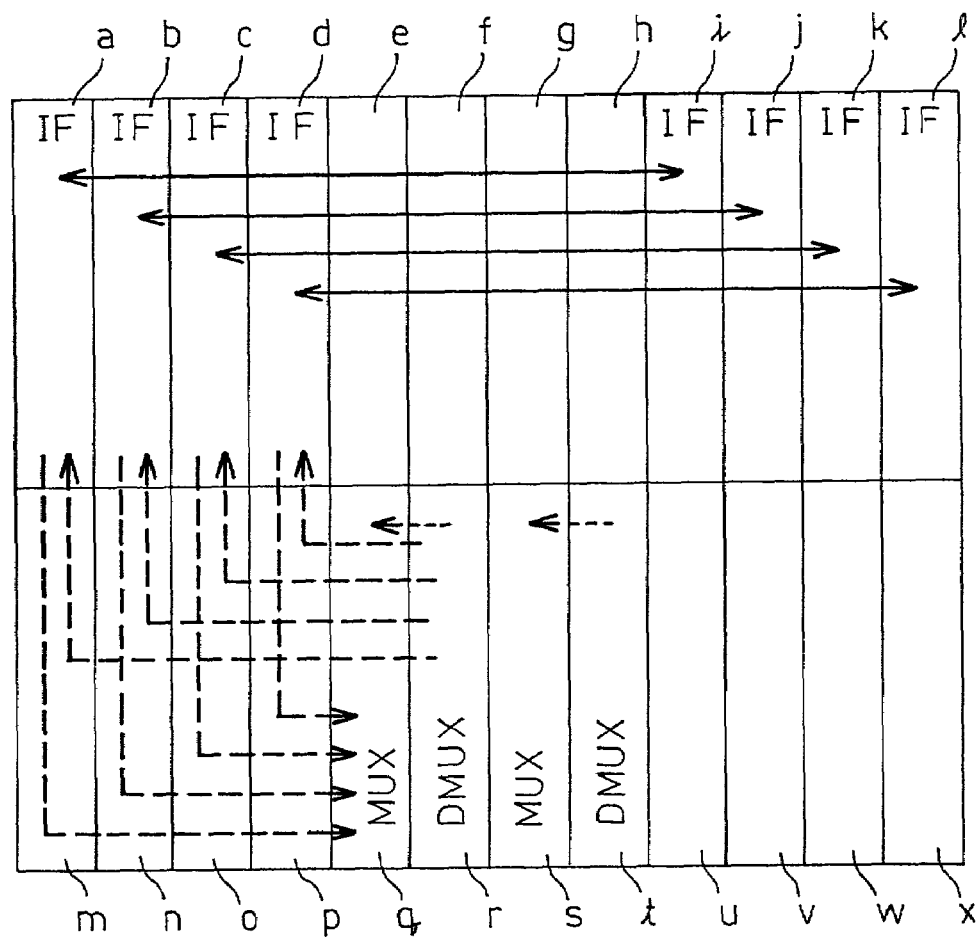
FIG. 15 is a diagram for explaining how signal lines are wired in a prior art transmission line terminating apparatus in the case where many PCBs are mounted within one unit.
Figure 16:
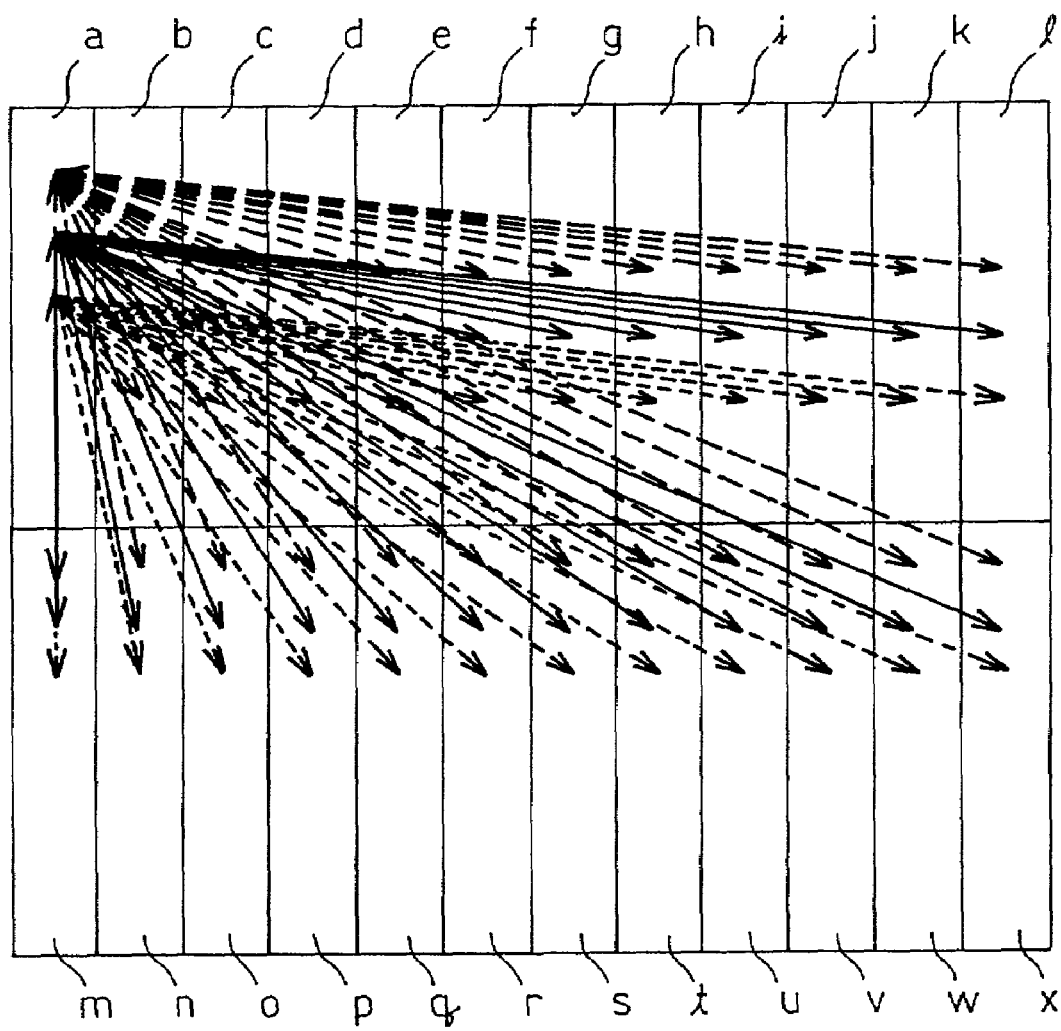
FIG. 16 is a diagram showing one example of wiring when transferring transparent signals and an alarm transfer signal among all the PCBs mounted within the unit shown in FIG. 15.

FIG. 12 is a block diagram showing the internal configuration of the supervisory control IC mounted on each of the main signal processing PCBs 95 (the low-speed interface boards, the switch board, the high-speed interface board, etc.) shown in FIG. 10. The illustrated example shows the configuration of the supervisory control (SC) IC 107 mounted on the high-speed interface board 102, but it will be appreciated that the supervisory control ICs on the other PCBs have the same configuration as shown here.

In FIG. 12, ATM cells received from the high-speed supervisory control line 94 and converted by the SERDES IC 108 into low-speed ATM cells are input to a received packet processor (R.PAC.PROC.) 121 where receive processing, such as cell synchronization, cell header error correction and cell discard, descramble, and CRC-10 check and cell discard by calculating the HEC (Header Error Control) in accordance with the ATM protocol, the same processing as performed by the receive packet processor (R.PAC.PROC.) 1103 in FIG. 11, is performed on each received ATM cell.

The processed cells are input to a packet type identifier 121 which sorts the received packets in the same manner as the packet type identifier 1104 in FIG. 11. Of the sorted packets, the transparent signals 1 and 2 are input to a packet disassembler 123, the alarm transfer signals 1 and 2 are input to a packet disassembler 124, and signals such as instructions are input to a packet disassembler 125.

The packet disassemblers 123 to 125 extract the transparent information, alarm transfer information, supervisory/control information, etc. stored in the information field of each ATM cell.

The extracted transparent information is sent from a transparent transmitter 126 to the high-speed interface IC 106. The extracted alarm transfer information is sent from an alarm transfer transmitter 127 to the high-speed interface IC 106. Reference numeral 129 indicates an interface that converts the transparent information and alarm transfer information to the interface format of the main signal circuit shown in FIG. 3E, to effect transmission from the supervisory control IC to the high-speed interface IC 106.

An optical/electrical converter 131 is connected between the high-speed interface (INF) IC 106 and the optical fiber 130.

On the other hand, the alarm transfer information from the high-speed interface IC 106 is received by an alarm transfer receiver 132, and the transparent information is received by a transparent receiver 133. Reference numeral 131 is an interface where the transparent information and alarm transfer information output from the high-speed interface IC 106 are converted from the main signal interface format shown in part (e) of FIG. 3 to the ATM cell format.

In a packet assembler 134, the response signal received via a supervisory/control register 128 is placed in the information field of the ATM cell. In a packet assembler 135, the alarm transfer information received via the alarm transfer receiver 132 is placed in the information field of the ATM cell. In a packet assembler 136, the transparent information received via the transparent receiver 133 is placed in the information field of the ATM cell.

A prioritizing (P) multiplexer 137 multiplexes the ATM cells using the same principle as the prioritizing multiplexer 1117 in FIG. 11.

A transmit packet processor (T.PAC.PROC.) 138 performs transmit processing such as HEC insertion, CRC-10 insertion, scramble, etc. in the same manner as the transmit packet processor 1118 in FIG. 11.

The ATM cell output from the transmit packet processor 138 is transmitted out on the high-speed supervisory control line 94 via the SERDES IC 108.

The configuration of the supervisory control IC is the same as described above if the high-speed interface IC 106 is replaced by other high-speed interface IC or by the switch IC 109 or the low-speed interface IC 112 or 115 shown in FIG. 10.

As described above, according to the present invention, as the transparent information and alarm information are all transmitted by sharing a supervisory/control line, there is no need to provide a dedicated line for each kind of information, and the amount of wiring between PCBs can be drastically reduced, offering the effect of being able to contribute to simplifying the apparatus configuration and reducing the cost of the apparatus.

Further, since the transparent information, alarm transfer information, and supervisory control response signals can be distributed in packet form with priority assigned to each packet according to the time criticality of the packet, there is offered the effect of being able to provide the performance that can flexibly meet customer needs.

Furthermore, since the transparent information and alarm information are all passed to one packet processing IC connected to all the PCBs in a star-like configuration, and the destination is set in the overhead of each packet so that the packet can be delivered to any desired PCB in the unit, each PCB can be inserted in any desired slot within the unit, thus offering the effect of simplifying the PCB insertion work.

The above description has been given by taking the ATM cell as an example of the packet, but the present invention is not limited to any specific type of packet. The same effects as described above can also be obtained in a system that uses any other type of packet, for example, the IP packet.

The invention claimed is:

1. A transmission line terminating apparatus comprising a central processing unit responsible for supervisory control and communication control of the entire apparatus, a single packet processing IC connected to the central processing unit, and a plurality of printed circuit boards connected in a star configuration with the packet processing IC at the center thereof, wherein each of the plurality of printed circuit boards is connected to the packet processing IC by a separate high-speed supervisory control line having a sufficient transmission capacity to transfer therethrough transparent information and alarm transfer information as well as information from the central processing unit in packet form, and the transparent information and the alarm transfer information are communicated between the printed circuit boards via the separate high-speed supervisory control line and via the packet processing IC, with provisions made for the packet processing IC to detect a destination from packet information received from an originating printed circuit board and transmit the packet information to a terminating printed circuit board corresponding to the detected destination.

2. A transmission line terminating apparatus as claimed in claim 1, wherein the packet processing IC converts the information received from the originating printed circuit board into a packet with time priority assigned thereto, and forwards the packet to the terminating printed circuit board in accordance with the time priority.

3. A transmission line terminating apparatus as claimed in claim 1, wherein each of the printed circuit boards includes a destination printed circuit board information inserter for inserting a terminating printed circuit board address in the packet information, and the packet processing IC detects the terminating printed circuit board address contained in packet data received from the originating printed circuit board and delivers the packet information, received from the originating printed circuit board, to the terminating printed circuit board identified by the detected address.

4. A transmission line terminating apparatus as claimed in claim 1, wherein the packet processing IC includes a link information setting unit for establishing a link between the originating printed circuit board and the terminating printed circuit board, and wherein the information setting unit detects a link destination, contained in packet data received from the originating printed circuit board, to identify the terminating printed circuit board, and the packet processing IC forwards the packet information, received from the originating printed circuit board, to the terminating printed circuit board identified as the link destination.

5. A transmission line terminating apparatus as claimed in claim 1, wherein data to be transmitted from the printed circuit board is transmitted in the form of a packetized cell.

6. A transmission line terminating apparatus as claimed in claim 5, wherein the packetized cell is a packet cell selected from a group including, but not limited to, an ATM cell and an IP cell.

* * * * *